# 2,830,085
AMINO ACID DERIVATIVES OF DITHIOOXAMIDE

Mona Phyllis Doerner, Walnut Creek, Calif., assignor to The Dow Chemical Company, Midland, Mich., a corporation of Delaware No Drawing. Application June 4, 1956
Serial No. 588,983

6 Claims. (Cl. 260—534)

This invention is concerned with amino acid derivatives of dithiooxamide having the formula

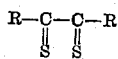

in which each R is a radical derived from an amino acid by removal of a hydrogen from the alpha amino group of the acid. These new compounds are all colored, crystalline solids soluble in many organic solvents and aqueous alkali metal hydroxide solutions. They have been found to be excellent chelating agents for iron, copper and nickel as well as plant growth promoters.

The new compounds may be prepared by reacting an amino acid with dithiooxamide having the formula

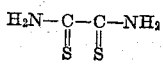

The reaction takes place smoothly at a temperature of 40° to 80° C. with the formation of the desired product and the evolution of ammonia. Good results are obtained when employing two molecular proportions of the amino acid with each molecular proportion of the dithiooxamide, although small molecular excesses of the amino acid do not interfere with the reaction. The reaction is carried out in the presence of water and the amino acid is neutralized with an alkali metal hydroxide before being contacted with the dithiooxamide. Upon completion of the reaction, the crude mixture is acidified as with a mineral acid to precipitate the desired product of reaction which is then separated in conventional fashion.

In carrying out the reaction, an aqueous solution of the amino acid salt is contacted portionwise with the dithiooxamide. The addition is carried out with stirring and at a temperature of 40° to 80° C. The reaction is relatively slow and may take from 8 to 10 hours to complete although from 1 to 4 hours is usually sufficient. When the reaction is complete, as evidenced by the dissolving of all of the suspended dithiooxamide, the reaction mixture is cooled to about 10° C. and acidified with concentrated hydrochloric acid to precipitate the reaction product. This product is separated by decantation or filtration and purified by recrystallization from an organic solvent such as acetone or methanol. Certain of the reaction products which are insoluble in these organic solvents are purified by dissolving them in dilute aqueous sodium hydroxide followed by reprecipitation by the addition of hydrochloric acid and subsequent filtration. Yields as high as 75 percent are obtained.

The following examples illustrate the invention but are not to be construed as limiting.

Example 1.—N,N'-dithiooxalyldiglycine 60 grams (0.5 mole) of dithiooxamide was added rapidly to a solution of 75 grams (1.0 mole) of glycine in 300 milliliters of water previously neutralized with 50 percent aqueous sodium hydroxide. The resulting mixture was stirred for 2.5 hours at 50° to 75° C. Ammonia was evolved during the reaction and a deep red solution formed. The reaction mixture was allowed to stand overnight. Concentrated hydrochloric acid was then added until a crude N,N'-dithiooxalyldiglycine product precipitated. This product was separated by filtration, dissolved in aqueous sodium hydroxide and reprecipitated with hydrochloric acid. The purified product was a cream-colored solid which was found to melt at 230°–231° C.

Example 2.—N,N'-dithiooxalyldi-DL-alpha-alanine

Dithiooxamide in the amount of 24 grams (0.2 mole) was added rapidly to a solution of 39.2 grams (0.44 mole) of DL-alpha-alanine in 150 milliliters of water neutralized with 50 percent aqueous sodium hydroxide. The resulting mixture was stirred for 3.5 hours at 40° to 55° C. Ammonia was evolved during the reaction and a deep red solution formed. The reaction mixture was neutralized with concentrated hydrochloric acid whereupon a crude N,N'-dithiooxalyldi-DL-alpha-alanine product precipitated. This product was separated and purified as described in Example 1. The purified product was an orange colored solid which was found to melt at 213°–218° C.

Example 3.—N,N'-dithiooxalyldi-DL-leucine 43.3 grams (0.33 mole) of DL-leucine were suspended in 150 milliliters of water and the solid solubilized by neutralization with 50 percent aqueous sodium hydroxide. Dithiooxamide (18 grams, 0.15 mole) was then rapidly added. The resulting mixture was stirred for 2.25 hours at 40° to 50° C. Ammonia was evolved during the reaction and a deep red solution formed. Upon completion of the reaction, the reaction mixture was neutralized with concentrated hydrochloric acid to precipitate a crude N,N'-dithiooxalyldi-DL-leucine product. This product was separated by filtration and recrystallized from methanol. The purified product was an orange, crystalline solid which was found to melt at 210°–215° C.

Example 4.—N,N'-dithiooxalyldi-β-alanine

To a suspension of 39.2 grams (0.44 mole) of β-alanine in 150 milliliters of water previously neutralized with 50 percent aqueous sodium hydroxide was added rapidly 24 grams (0.2 mole) of dithiooxamide. The resulting mixture was stirred for 1.25 hours at 50° to 60° C. Ammonia was evolved during the reaction and a deep red solution formed. The reaction mixture was processed as described in Example 3 to obtain an N,N'-dithiooxalyldi-β-alanine product as an orange solid. This product was crystallized from a 50–50 mixture of acetone and methanol and found to melt at 199°–201° C.

Example 5.—N,N'-dithiooxalyldi-DL-serine

Dithiooxamide (18 grams, 0.15 mole) was added rapidly to a solution of 34.7 grams (0.33 mole) of DL-serine in 125 milliliters of water neutralized with 50 percent aqueous sodium hydroxide. The resulting mixture was stirred for 4 hours at 50°–70° C. Ammonia was evolved during the reaction and a deep red solution formed. Upon neutralization of the reaction mixture with concentrated hydrochloric acid as previously described, there was obtained an N,N'-dithiooxalyldi-DL-serine product as an orange colored solid. This product was crystallized from methanol and found to melt at 200°–203° C.

Example 6.—N,N'-dithiooxalyldi-DL-asparagine

Dithiooxamide in the amount of 18 grams (0.15 mole) was added rapidly to a suspension of 49.5 grams (0.33 mole) of DL-asparagine in 100 milliliters of water neutralized with 50 percent aqueous sodium hydroxide. The resulting mixture was stirred for 3.5 hours at 60° C. Ammonia was evolved during the reaction and a deep red solution formed. The reaction mixture was then neutralized with concentrated hydrochloric acid and allowed to stand at room temperature until precipitation of the N,N'-dithiooxalyldi-DL-asparagine product was complete. This product was filtered and found to melt at 171°–176° C.

*Example 7.—N,N'-dithiooxalyldi-DL-threonine*

24 grams of dithiooxamide (0.2 mole) was added rapidly to a suspension of 52.4 grams (0.44 mole) of DL-threonine in 125 milliliters of water previously neutralized with 50 percent aqueous sodium hydroxide. The resulting mixture was stirred for 4 hours at 50° to 60° C. Ammonia was evolved during the reaction and a deep red solution formed. The reaction mixture was neutralized with concentrated hydrochloric acid to precipitate an N,N'-dithiooxalyldi-DL-threonine product. The product was separated by filtration and crystallized from acetone. It was an orange solid which melted at 200°–205° C.

*Example 8.—N,N'-dithiooxalyldi-L-glutamic acid*

64.8 grams (0.44 mole) of L-glutamic acid were suspended in 125 milliliters of water and the solid put in solution by neutralization with 50 percent aqueous sodium hydroxide. Dithiooxamide (24 grams, 0.2 mole) was then added rapidly. The resulting mixture was stirred for 3.5 hours at 50° to 60° C. Ammonia was evolved during the reaction and a deep red solution formed. The reaction mixture was neutralized with concentrated hydrochloric acid and the neutralized mixture extracted three times with 30 milliliter portions of diethyl ether. Upon evaporation of the ether, there was obtained an N,N'-dithiooxalyldi-L-glutamic acid product as a syrupy residue. An equal volume of concentrated hydrochloric acid was added to this residue and the mixture allowed to stand for several days. An orange solid precipitated which was separated by filtration and dried over phosphorus pentoxide. This solid product was found to melt at 133°–138° C.

*Example 9.—N,N'-dithiooxalyldi-DL-methionine*

Dithiooxamide in the amount of 12 grams (0.10 mole) was added rapidly to a solution of 32.8 grams (0.22 mole) of DL-methionine in 100 milliliters of water neutralized with 50 percent aqueous sodium hydroxide. The resulting mixture was stirred for 2.5 hours at 50° to 65° C. Ammonia was evolved during the reaction and a deep red solution formed. The reaction mixture was processed as described in Example 7 to obtain an N,N'-dithiooxalyldi-DL-methionine product as an orange solid. This product was crystallized from methanol and found to melt at 183°–187° C.

*Example 10.—N,N'-dithiooxalyldi-L-arginine*

To a solution of 46.4 grams (0.22 mole) of L-arginine in 100 milliliters of water neutralized with 50 percent aqueous sodium hydroxide solution was added rapidly 12 grams (0.1 mole) of dithiooxamide. The resulting mixture was stirred for 2.5 hours at 40° to 50° C. Ammonia was evolved during the reaction and a deep red solution formed. The reaction mixture was processed as described in Example 7 to obtain an N,N'-dithiooxalyldi-L-arginine product as an orange solid. This product decomposed above 220° C. without apparent melting.

In a similar manner other amino acid derivatives of dithiooxamide may be prepared as follows:

N,N'-dithiooxalyldi-DL-ethionine by the reaction of dithiooxamide and DL-ethionine.

N,N'-dithiooxalyldihomocysteine by the reaction of dithiooxamide and homocysteine.

N,N'-dithiooxalyldinorleucine by the reaction of dithiooxamide and norleucine.

N,N'-dithiooxalyldi-DL-valine by the reaction of dithiooxamide and DL-valine.

N,N'-dithiooxalyldinorvaline by the reaction of dithiooxamide and norvaline.

N,N'-dithiooxalyldicysteine by the reaction of dithiooxamide and cysteine.

N,N'-dithiooxalyldi-α-aminobutyric acid by the reaction of dithiooxamide and α-aminobutyric acid.

N,N'-dithiooxalyldi-L-glutamine by the reaction of dithiooxamide and L-glutamine.

N,N'-dithiooxalyldi-DL-aspartic acid by the reaction of dithiooxamide and DL-aspartic acid.

N,N'-dithiooxalyldi-β-aminobutyric acid by the reaction of dithiooxamide and β-aminobutyric acid.

The new compounds of the present invention have been found to be excellent chelating agents for iron, copper, nickel and other metals. The chelates thus formed exhibit the very desirable property of being soluble in aqueous media at pH values of more than 7.0. This property is particularly advantageous in supplying trace elements to soil to promote the growth of plants and particularly plants growing in soils of alkaline reaction.

I claim:

1. Amino acid derivatives of dithiooxamide having the formula

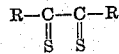

in which R represents a member of the group consisting of (A) a radical derived from β-alanine by the removal of a hydrogen atom from the beta-amino group and (B) the radicals derived from an aliphatic alpha-amino acid by removal of a hydrogen atom from the alpha-amino group.

2. N,N'-dithiooxalyldi-DL-serine.
3. N,N'-dithiooxalyldi-DL-methionine.
4. N,N'-dithiooxalyldi-L-arginine.
5. N,N'-dithiooxalyldi-β-alanine.
6. N,N'-dithiooxalyldi-L-glutamic acid.

References Cited in the file of this patent

Hackh's Chemical Dictionary (3rd ed.) (1944), p. 37.